United States Patent
Im

(10) Patent No.: US 8,674,828 B2
(45) Date of Patent: Mar. 18, 2014

(54) REAL TIME LOCATION SYSTEM AND METHOD FOR CACHING LOCATION INFORMATION BASED ON FINGER PRINTING

(75) Inventor: Chang Jun Im, Asan (KR)

(73) Assignee: LS Industrial Systems Co., Ltd., Anyang-Si, Gyeonggi-Do (KR)

(*) Notice: Subject to any disclaimer, the term of this patent is extended or adjusted under 35 U.S.C. 154(b) by 568 days.

(21) Appl. No.: 12/958,301

(22) Filed: Dec. 1, 2010

(65) Prior Publication Data

US 2011/0128124 A1 Jun. 2, 2011

(30) Foreign Application Priority Data

Dec. 2, 2009 (KR) .................. 10-2009-0118274

(51) Int. Cl.
*G08B 1/08* (2006.01)
(52) U.S. Cl.
USPC ............. 340/539.21; 340/539.13; 340/539.2
(58) Field of Classification Search
None
See application file for complete search history.

(56) References Cited

U.S. PATENT DOCUMENTS

2007/0121560 A1* 5/2007 Edge .............................. 370/338
2007/0247366 A1* 10/2007 Smith et al. .................. 342/464

FOREIGN PATENT DOCUMENTS

CN 101346638 1/2009

* cited by examiner

*Primary Examiner* — Mohammad Ghayour
*Assistant Examiner* — Brian Wilson
(74) *Attorney, Agent, or Firm* — Lee, Hong, Degerman, Kang & Waimey

(57) ABSTRACT

Disclosed is a location tracking system and the method thereof for storing location information. The location tracking system includes at least one beacon apparatus arranged to transmit a beacon signal to a tag; a tag at any position respectively measuring a signal intensity of beacon signals received from surrounding at least one beacon apparatus, and transmitting a measured per-beacon signal intensity to a specific beacon apparatus; and a server arranged to determine if at least any one of signal intensities exceeds a set maximum value by analyzing a per-beacon signal intensity input from the specific beacon apparatus, and store a location-based signal intensity into a database by equally dividing a distance between corresponding beacon apparatuses and then distributing a measured signal intensity into a divided each position in multiple cases the signal intensity exceeds a set maximum value.

7 Claims, 4 Drawing Sheets

REAL TIME LOCATION SYSTEM AND METHOD FOR CACHING LOCATION INFORMATION BASED ON FINGER PRINTING

Pursuant to 35 U.S.C. §119(a), this application claims the benefit of earlier filing date and right of priority to Korean Patent Application No. 10-2009-0118274, filed on Dec. 2, 2009, the contents of which are hereby incorporated by reference in their entirety.

BACKGROUND OF THE INVENTION

1. Field of the Invention

The present invention relates to a finger printing-based location tracking system, more particularly, to a location tracking system and the method thereof for storing location information based on a finger printing to estimate a tag position and a moving path unaidedly and building up a location database when building up location data per signal intensity in the location tracking system.

2. Description of the Related Art

An RLTS (Real Time Location System) is a technology of tracking in real time a position of a person or equipment in a limited space such as a construction site, an amusement park, and a hospital. Such a location system may be divided into a triangulation and a finger printing technique in view of measurement techniques. The triangulation refers to a technique of obtaining a distance to three known points thereby to acquire an error-minimized position, in which each distance can be achieved by converting a TDOA (Time Difference of Arrival) of electric waves to a length or an RSSI (received signal strength indicator) of signals to a corresponding distance.

Furthermore, a finger printing technique makes reference to recording a characteristic of signals (intensity of signals, etc) at a specific position for a database and searching for characteristics of a signal obtained at any position from the database, for estimation of a current position. Such a finger printing technique may be divided into two procedures. That is, a pre-process procedure that records characteristics of a signal, and maps it to a position atlas to build up a database, and a post-process procedure searching for a signal's characteristic from a database.

Herein, a real time location system mainly employs a wireless LAN or on RFID (radio frequency identification) technology, having availability in many fields based on adopted methods.

FIG. 1 is a diagram shown for describing a location recognition method using a signal strength according to the prior art.

Referring to FIG. 1, a tag 30 at any point obtains a signal strength through signals received from surrounding beacon apparatuses 10a~10c, and transmits an obtained signal strength per beacon to a beacon apparatus 10c.

A server 50 stores any position information from a beacon apparatus 10c (in advance known to the server as position information of a tag) and the signal strength of that position in a database.

That is, the server 50 beforehand builds a database by matching all possible positions to signal strengths of these, and estimates a corresponding position matched to a signal strength through a retrieval when inputted with the specific signal strength from the tags 10a~10c.

As described above, a location recognition method of the prior art gathers data using a specific sample-oriented tag in establishing a database, in which for a reception sensitivity of all tags may not be identical, an error per tag occurs. Also, in a wide space environment, it takes relatively long hours to gather data and thus time and cost, in proportion to this, extend. In addition, considering in terms of an RF charateristic, an intensity of signals can vary on its property due to seasons or atmospheric conditions, the existing technology cannot help newly builing up a database each time using a specific sample-use tag. This is considerably irrational in an aspect of time and cost.

SUMMARY OF THE INVENTION

The present invention provides a location tracking system and the method thereof for storing location information based on a finger printing to estimate a position of tags and a moving path unaidedly and building up a location database when building location data per signal intensity in the location tracking system.

Technical challenges to be attained by the present invention is unrestricted to the above-described ones, a person skilled in the art would probably clearly understand other technical flaws as yet not mentioned, from the following recitation.

To achieve the aforementioned objective, a location tracking system for storing location information of the present invention is provided the system comprising: at least one beacon apparatus arranged to transmit a beacon signal to a tag; a tag at any position for measuring each signal intensity of beacon signals received from surrounding at least one beacon apparatus, and transmitting a measured per-beacon signal intensity to a specific beacon apparatus; and a server arranged to determine if at least any one of signal intensities exceeds a set maximum value by analyzing a per-beacon signal intensity inputted from the specific beacon apparatus, and store a location-based signal intensity into a database by equally dividing a distance between corresponding beacon apparatuses and then distributing a measured signal intensity into a divided each position in mutiple cases the signal intensity exceeds a set maximum value.

The beacon signal may include unique identification information, wherein the unique identification information is an MAC (media access control) address, and equals a maximum signal intensity of a received signal in a maximum value set in the server.

The server may include a signal strength determination unit determining if at least any one of signal intensities exceeds a set maximum value by analyzing a beacon-based signal intensity input from a specific beacon apparatus; a beacon counter increasing a beacon count in a case the signal intensity exceeds a maximum value; and a location information processing unit storing a location-based signal intensity into a database by equally dividing a measured distance between beacon apparatuses and then distributing a measured signal intensity into a divided each position in a case the beacon count equals a reference value compared with the set reference value.

To achieve the aforementioned objective, a finger print-based location information storing method of the present invention in provided, the method comprising: measuring a signal intensity of a beacon signal received from a surrounding beacon apparatus, and transmitting a measured beacon-baed signal intensity through a specific beacon apparatus to a server, by a tag; determining if there is at least any one signal intensity equal to or exceeding a set maximum value by analyzing a beacon-based signal intensity input from the specific beacon apparatus, by a server; recording a position of a corresponding beacon apparatus, increasing a beacon count by one, and then storing a beacon-based measurement time and signal intensity by a server in a case the at least one signal intensity equals or exceeds a maximum value; storing the beacon-based measurement time and signal intensity and determining if the beacon count equals a set reference value; and storing signal intensity-based location information by equally dividing a distance between a multiple of beacon apparatuses and then distributing a signal intensity into a divided each position in a case the beacon count equals a set reference value.

A value of the beacon count may be equal to a number of a beacon apparatus detected to maximum values, wherein a beacon count initializes when location information between a multiple of beacon apparatuses is built up, and wherein if a beacon count does not amount to a set reference value as the above-mentioned, a step of determining if there exists a beacon-based signal intensity input from the specific beacon apparatus equaling or exceeding a set maximum value is re-performed, and if at lease any one signal intensity of the above-mentioned does not amount to a maximum value, it is configured that a beacon-based current time and signal intensity is stored, and wherein a maximum value set into the server equals a maximum signal intensity of a received signal.

DETAILED DESCRIPTION OF THE INVENTION

Figure 1:
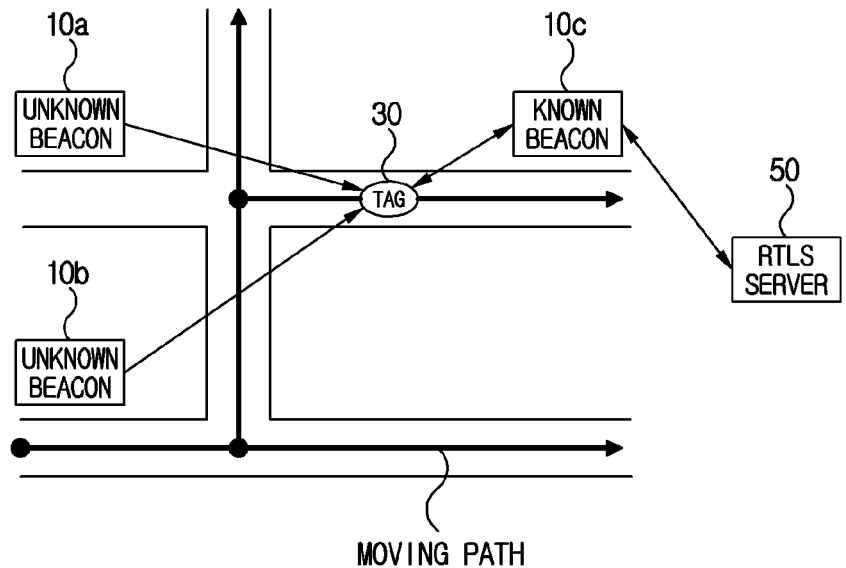
FIG. 1 is a diagram shown to describe a signal intensity using location recognition method according to the prior art.

Hereinafter, a preferred embodiment of the invention will be described in stark in reference to the accomapanying drawings. In the drawings, same components are designated into same signs whereever they are. Also, a detailed description of publicly-awared functions and constructions resultantly unnecessarily obscuring substances of the present invention may be omitted.

A real time location tracking system of a finger printing technique applied with the invention may be divided into a database build task and a location estimation task.

The database build task is one kind of site survey task affording that a person or a moving object attached with a tag roams around any place (a limited space intended for position estimation), receives a signal intensity from surrounding possible all beacon apparatuses at any place and inter-matches position information (as position information of a tag, known in advance to a server) to signal intensity information, in a database build-up.

The position estimation task is a procedure of estimating a position of tags in an RTLS server based on a built-up database, identified with a task of estimating any place in question by comparing a signal intensity obtained from any position with a previously built database.

That is, it estimates a position of any tag upon building up a database using a specific sample-oriented tag.

Figure 2:
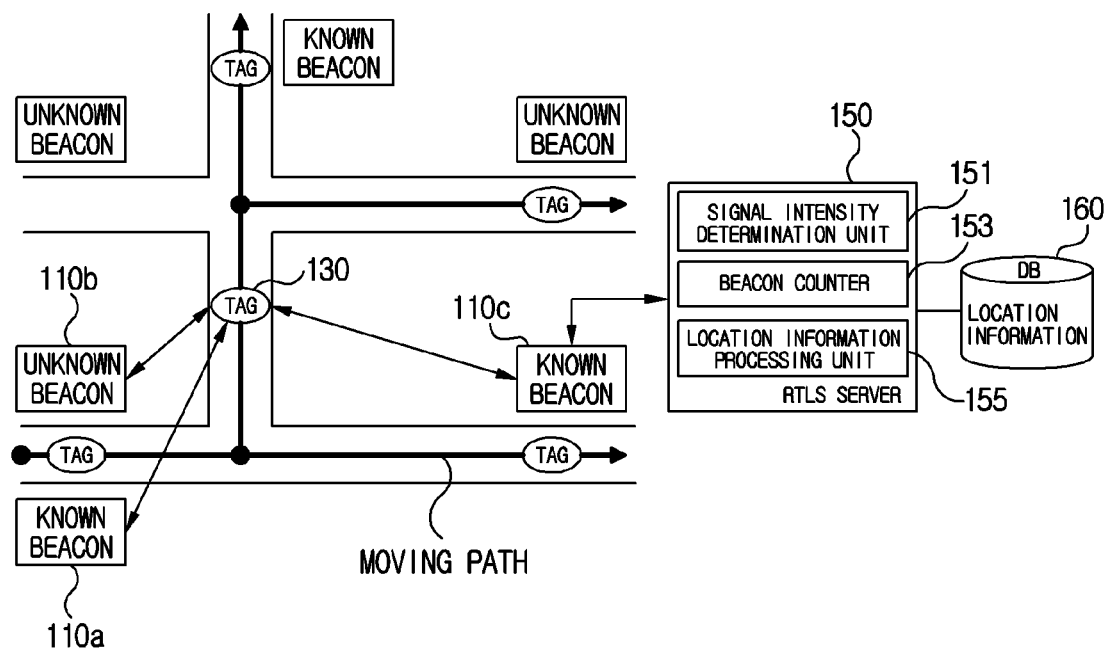
FIG. 2 is a diagram indicating a location tracking system for storing finger-print based location information according to an embodiment of the invention.

FIG. 2 is a diagram indicating a location tracking system for finger-printing based position information storing according to an embodiment of the present invention, in which a location tracking system with its construction includes a multiple of beacon apparatuses 110a~110b, a tag 130, and an RTLS server 150. Through FIG. 2, a database build procedure of storing position information of a finger-printing based location tracking system will be observed.

A multiple of beacon apparatuses 110a~110c each transmit a beacon signal to a tag 130 as well as transmit a beacon-based signal intensity received from the tag 130 to a connected RLTS server 150. The beacon signal includes unique identification information such as an MAC address for each beacon apparatus.

The tag 130 at any place measures a signal intensity of a beacon signal received from surrounding beacon apparatuses 110a~110c, and transmits a measured beacon-based signal intensity to a specific beacon apparatus 110a or 110c. When transmitting a measured signal intensity into the specific beacon apparatus 110c connected to the RTLS server 150, the tag 130 transmits unique identification information of each beacon apparatus 110a~110c with this.

The RTLS server 150 determines if at least any one signal intensity exceeds a set maximum value by analyzing a beacon-based signal intensity input from a specific beacon apparatus 110c, and if the signal intensity exceeds a set maximum value at many times, equally divides a distance between corresponding beacon apparatuses 110a~110c and distributes the measured signal intensity into divided each position and then stores and builds a position-based signal intensity into the database 160. In terms of a maximum value set to the RTLS server 150, it is preferable to set equal to a maximum signal intensity of an actual received signal or slightly lower than that in consideration of a measurement error.

Also, the RTLS server 150 with its construction includes a signal intensity determination unit 151 configured to determine if at least any one signal intensity exceeds a set maximum value by analyzing a beacon-based signal intensity delivered from a specific beacon apparatus 110c, a beacon counter 153 augmenting a beacon count in a case the signal intensity exceeds a maximum value, and a position information processing unit 155 configured to equally divide a measured distance between beacon apparatuses 110a~110c and distribute signal intensities measured at a divided each position and then storing a location-based signal intensity into the database 160, in a case the beacon count is identical to a reference value compared with the set reference value.

In addition, the beacon apparatuses 110a~110c as described above may be divided into a known beacon network-connected with the RTLS server 150 (110a and 110c) and an unknown beacon not-connected via a network to the RTLS server 150 (110b), and in a case of the known beacons 110a and 110c unique position information is stored in advance in an RTLS server 150, and also in storage of a distance between known beacons 110a and 110c in advance.

The tag 130 described above measures an intensity of a received signal by obtaining a beacon signal from each beacon apparatus stationary in position 110a~110c and then transmits unique identification information and signal intensities measured of each beacon apparatus 110a~110c into the RTLS server 150 through specific beacon apparatuses 110a~110c. The tag 130 is installed with a tracked object, communicating with beacon apparatuses 110a~110c in a short-range communication mode such as WiFi, Wireless LAN, Bluetooth, Zigbee or UWB (Ultra Wide Band).

On the one hand, a multiple of beacon apparatuses 110a~110c outputs a beacon signal into the tag 130 side in a pre-defined period and also a known beacon apparatus 110c, in a case a received signal intensity containing unique identification information received from the tag 130, transmits it to the RTLS server 150.

Next, a method of establishing a database from known beacon apparatuses 110a, 110c using FIGS. 3a through 3c will be presented below.

Figure 3A:
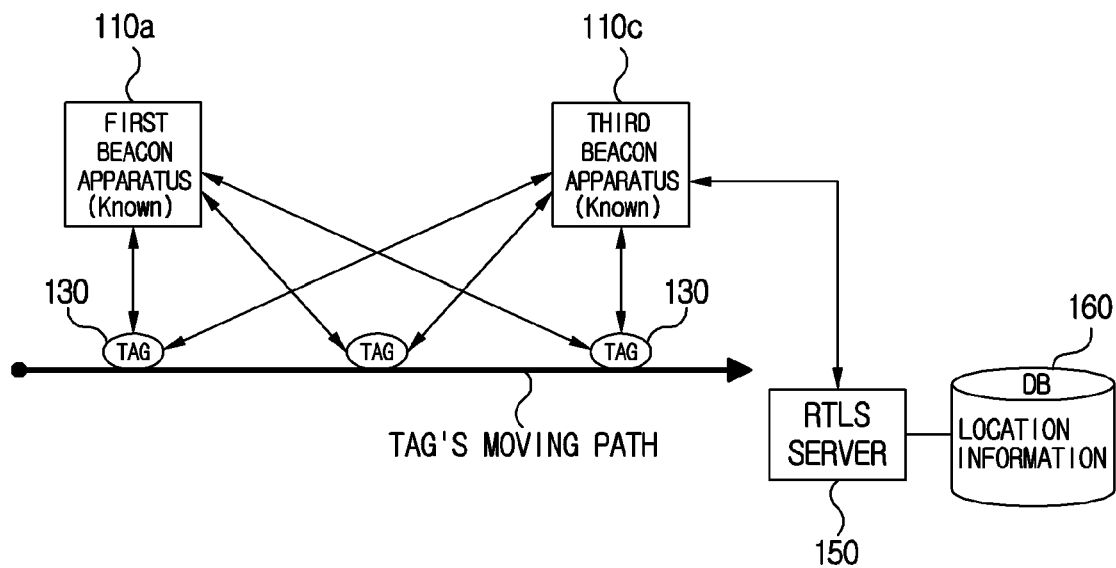
FIGS. 3a through 3c are diagrams shown to describe a method of establishing a location information database according to the present invention.

As shown in FIG. 3a, when there is a path atlas in which a tag 130 moves from a first beacon apparatus 110a to a third beacon apparatus 110c, a prior art technique stores a position-based signal intensity while the tag 130 is moving, whereas the present invention builds up a database by estimating a position and a moving path of the tag 130 unaidedly at an RTLS server 150.

Figure 3B:
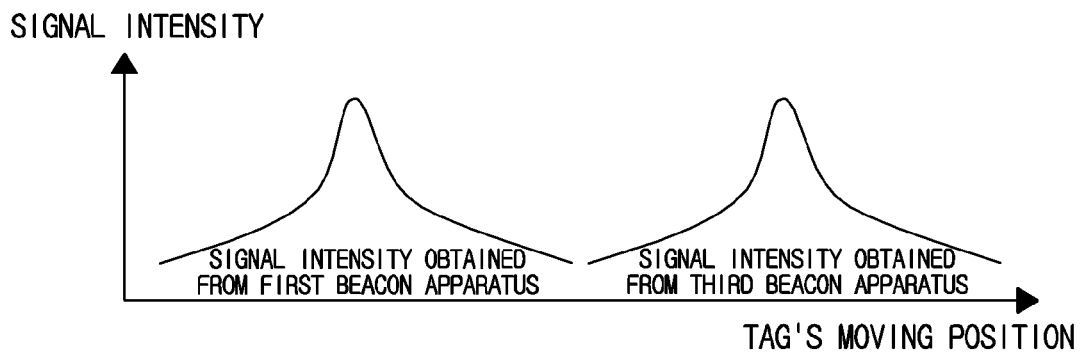

Seeing into FIG. 3b, it can be known that as a tag 130 approaches specific beacon apparatuses 110a, 110c, an intensity of signals received from that beacon apparatus 110a, 110c increases. Therefore, the RTLS server 150 determines a position obtaining a preset maximum value, that is the highest signal intensity, as equal to a location of each beacon apparatus 110a, 110c, and continuously records signal intensities. For example, the RTLS server 150, in a case a signal intensity obtained at the tag 130 from a first beacon apparatus 110a is a maximum value compared with a preset maximum value, assumes a position of the tag 130 equal to the first beacon apparatus 110a. And, after a certain time elapses, the RTLS server 150, in a case a signal intensity obtained at the tag 130 from a third beacon apparatus 110c is a maximum value compared with a preset maximum value, assumes a position of the tag 130 equal to the third beacon apparatus 110c. The first beacon apparatus 110a and the third beacon apparatus 110c are known beacons, and each position and a distance between each beacon apparatus 110a, 110c are known in advance to the RTLS server 150, in which the RTLS server 150 stores unique identification information and position information of known beacons 110a, 110c in a matched type.

In the end, the RTLS server 150 can recognize a time and a distance of the tag 130 moving from a first beacon apparatus 110a to 110c, capable of knowing a signal intensity-based position supposing a moving velocity of the tag 130 is uniform by equally dividing the distance and calculating each location-based signal intensity, and building location information per signal intensity of each beacon apparatus 110a, 110c in a database.

Figure 3C:
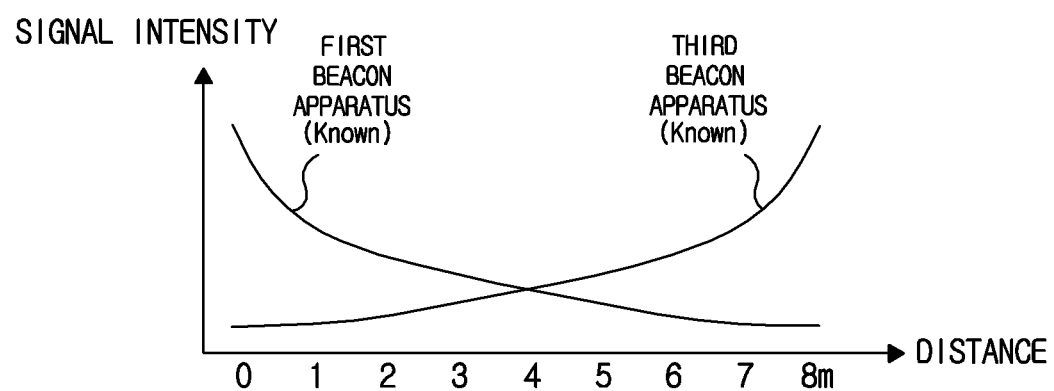

That is, as shown in FIG. 3c, when the tag 130 moves from a first beacon apparatus 110a to a third beacon apparatus 110c, an RTLS server 150 analyzes signal intensities of the first beacon apparatus 110a and the third beacon apparatus 110c sent from the tag 130, wherein in a case a signal intensity of the first beacon apparatus 110a has a set maximum value, the tag 130 determines it equal to a position of the first beacon apparatus 110c, and in a case a signal intensity of the third beacon apparatus 110c has a set maximum value, the tag 130 determines it equal to a position of the third beacon apparatus 110c.

And, the RTLS server 150 continuously stores all the signal intensity and measurement time in a case signal intensities of the first beacon apparatus 110a and the third beacon apparatus 110c are not maximum values.

Herein, the RTLS server 150 knows in advance a position of the first beacon apparatus 110a and a position of the third beacon apparatus 110c and a distance between the first beacon apparatus 110a and the third beacon apparatus 110c. A time when the tag 130 passes the first beacon apparatus 110a and a time of passing the third beacon apparatus 110c can be known through a measurement, and thus a moving time between the first and the third beacon apparatuses 110a, 110c can be known through a computation.

In the end, the RTLS server 150 can know a needed time in order that the tag 130 arrives from the first beacon apparatus 110a to the third beacon apparatus 110c, and for it knows the entire moving distance being 8 m, based on this possibly builds a position per signal intensity in a database.

Herein, it is assumed that a moving velocity of the tag 130 is the same, but when an actual moving velocity is not the same, there can occur an error.

If a moving velocity of the tag 130 is measured lower than the average or more than the average, determined is a motion of an abnormal path or means, thereby discarding a measured data.

Figure 4:
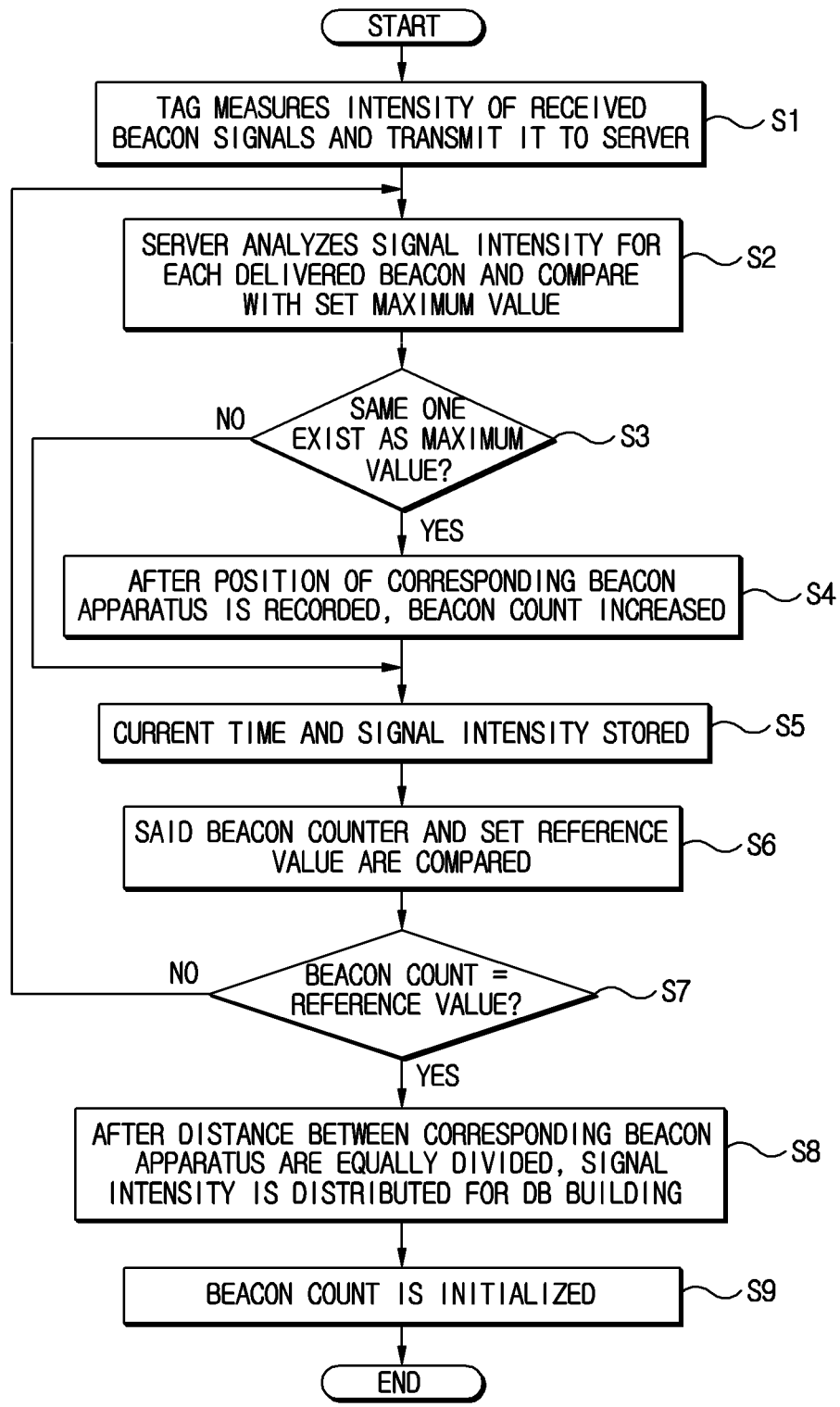
FIG. 4 is a flowchart indicating a location information building procedure according to an embodiment of the invention.

FIG. 4 is a flowchart indicating a signal intensity-based location information store procedure according to an embodiment of the present invention, it is described with reference to FIGS. 2 through 3c.

First, the RTLS server 150 stores some information relating a position of known beacons 110a, 110c, . . . , a distance between each beacons 110a, 110c and a maximum value of signal intensities, respectively.

Subsequently, the tag 130 at any position measures a signal intensity of a beacon signal received from a surrounding beacon apparatus 110a~110c, and transmits a measured beacon-based signal intensity to a specific beacon apparatus 110c (S1). When transmitting a measured signal intensity to the specific server 110c connected with an RTLS server 150, the tag 130 together transmits unique identification information of each beacon apparatus 110a~110c.

The RTLS server 150 analyzes a beacon-based signal intensity transferred from the specific beacon apparatus 110c and compares it with a preset maximum value, and as a comparison result, determines if there is at least any one signal intensity equal to or exceeding a set maximum value (S2, S3).

When the at least any one signal intensity equals or exceeds a maximum value, the RTLS server 150 records a position of a corresponding beacon apparatus the signal intensity of which exceeds a maximum value, and increases a beacon count by one and then stores a beacon-based current time and a signal intensity (S4, S5). A value of the beacon count means a number of beacon apparatuses detected to a maximum value.

On one hand, in a case at least any one signal intensity dose not amount to a maximum value (the step S3), the beacon count is not increased, and a beacon-based measured current time and a signal intensity are stored (S5).

Succeedingly, the RTLS server 150 compares the beacon count with a preset reference value to determine that a beacon count equals a set reference value (S6, S7), and in case the beacon count equals a set reference value, a distance between a plurality of beacon apparatuses 110a, 110c is equally divided and for each divided position signal intensities are distributed, and then position information per signal intensity is built up into a database (S8). In the foregoing part, a reference value may be '2' (meaning that two of beacon apparatuses 110a~110c are detected to a maximum value), and when location information between a plurality of beacon apparatuses 110a~110c is built up, the RTLS server 150 also initializes a beacon count into '0'.

If a beacon count does not amount to a set reference value in the step (S7), a step of determining if there exists a beacon-based signal intensity input from specific beacon apparatuses 110a~110c equaling or exceeding a set maximum value (S2) is re-performed.

While the present invention has been described with reference to embodiments in the above part, those skilled in the art can realize other forms of embodiments than a detailed desription of the invention without departing from an essential technical scope of the present invention. Herein, the essential technical scope of the invention resides in claims, and it should be understood that the present invention encompasses all the variations falling in its equivalent scope.

What is claimed is:

1. A location tracking system for storing finger-print based location information, the system comprising:
a plurality of beacon apparatuses, each beacon apparatus configured to transmit a beacon signal, wherein one or more of the beacon signals are received by a tag configured to measure a signal intensity of each of the one or more received beacon signals and to transmit a set of information, the set of information including the one or more measured signal intensities and identification information that identifies the beacon apparatus corresponding to each measured signal intensity, wherein the tag repeatedly receives one or more of the beacon signals and measures one or more signal intensities to transmit multiple sets of information; and
a server configured to:
obtain each of the sets of information and store the measured signal intensities;
determine, for each set of information, if one of the one or more measured signal intensities exceeds a maximum value, the maximum value based on the beacon apparatus corresponding to the measured signal intensity;
increase a beacon count if one of the one or more measured signal intensities is determined to exceed the maximum value;
determine if the beacon count equals a reference value;
determine a location-based signal intensity if the beacon count is determined to equal the reference value, wherein determining the location-based signal intensity includes associating the stored measured signal intensities with positions along a path between each of the beacon apparatuses corresponding to each of the measured signal intensities exceeding the corresponding maximum value; and
store the location-based signal intensity in a database.

2. The location tracking system of claim 1, wherein each of the beacon signals includes unique identification information, wherein the unique identification information is an MAC (media access control) address.

3. The location tracking system of claim 1, wherein the maximum value is equal to a maximum signal intensity of the corresponding beacon apparatus.

4. A finger print-based location information storing method, the method comprising:
measuring signal intensities of beacon signals received from a plurality of beacon apparatuses, and transmitting multiple sets of information to a server, each set of information including one or more of the measured signal intensities and identification information that identifies which one of a plurality of beacon apparatuses corresponds to each measured signal intensity;
storing the measured signal intensities;
determining, by the server, for each set of information, if one of the one or more measured signal intensities exceeds a maximum value, the maximum value based on the beacon apparatus corresponding to the measured signal intensity;
increasing a beacon count if one of the one or more measured signal intensities is determined to exceed the maximum value;
determining if the beacon count equals a reference value;
determining a location-based signal intensity if the beacon count equals the reference value, wherein determining the location-based signal intensity includes associating the stored measured signal intensities with positions along a path between each of the beacon apparatuses corresponding to each of the measured signal intensities exceeding the corresponding maximum value; and
storing the location-based signal intensity in a database.

5. The method of claim 4, further comprising:
initializing the beacon count when location-based signal intensity is stored.

6. The method of claim 4, wherein if the beacon count is determined to not equal the reference value, the server repeats the determining if one of the one or more measured signal intensities exceeds the maximum value.

7. The method of claim 4, wherein the maximum value is equal to a maximum signal intensity of the corresponding beacon apparatus.

* * * * *